(12) United States Patent
Ohashi

(10) Patent No.: US 7,058,236 B2
(45) Date of Patent: Jun. 6, 2006

(54) IMAGE READING APPARATUS AND PROGRAM

(75) Inventor: Kazuhito Ohashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 10/152,064

(22) Filed: May 21, 2002

(65) Prior Publication Data

US 2002/0176634 A1    Nov. 28, 2002

(30) Foreign Application Priority Data

May 25, 2001    (JP)    ............................. 2001-157586

(51) Int. Cl.
*G06K 9/40*    (2006.01)

(52) U.S. Cl. ...................... 382/275; 382/291; 382/295; 358/3.26; 358/486

(58) Field of Classification Search ................ 382/274, 382/275, 291, 112, 293, 295; 358/3.26, 3.27, 358/463, 486, 488
See application file for complete search history.

(56) References Cited

U.S. PATENT DOCUMENTS

| | | | |
|---|---|---|---|
| 5,362,958 A * | 11/1994 | Ando | ...................... 250/208.1 |
| 5,500,745 A * | 3/1996 | Iishiba et al. | ................ 358/461 |
| 5,572,433 A * | 11/1996 | Falconer et al. | ............ 700/127 |
| 5,734,758 A * | 3/1998 | Yamamoto et al. | ......... 382/274 |
| 5,982,948 A * | 11/1999 | Shimada et al. | ............ 382/274 |
| 6,563,938 B1 * | 5/2003 | Harada | ........................ 382/108 |
| 6,792,161 B1 * | 9/2004 | Imaizumi et al. | ........... 382/275 |

* cited by examiner

*Primary Examiner*—Samir Ahmed
*Assistant Examiner*—Yosef Kassa
(74) *Attorney, Agent, or Firm*—Morgan & Finnegan LLP

(57) ABSTRACT

The object of this invention is to provide an image reading apparatus capable of greatly reducing generation of a black streak image caused by dust, dirt, or the like at a flow scanning position on a document glass table in flow scanning of reading a document image while moving the document sheet at a predetermined speed. To achieve this object, the CPU of the image reading apparatus performs dust detection processing of detecting dust on the document glass table by a dust detection circuit during a document nonreading period. The CPU executes dust correction processing based on the dust detection result during continuous document reading. During an interval between the end of a series of image reading JOBs and the next image reading JOB, the CPU performs dust avoidance processing of changing the flow scanning position to a position free from any dust on the document glass table. If dust is difficult to avoid, the CPU inhibits flow scanning and executes control of switching flow scanning to optical scanning document reading.

10 Claims, 15 Drawing Sheets

FLOW-SCANNED IMAGE OF AUTOMATIC DOCUMENT FEEDING BELT (WHITE) [AFTER BINARIZATION]

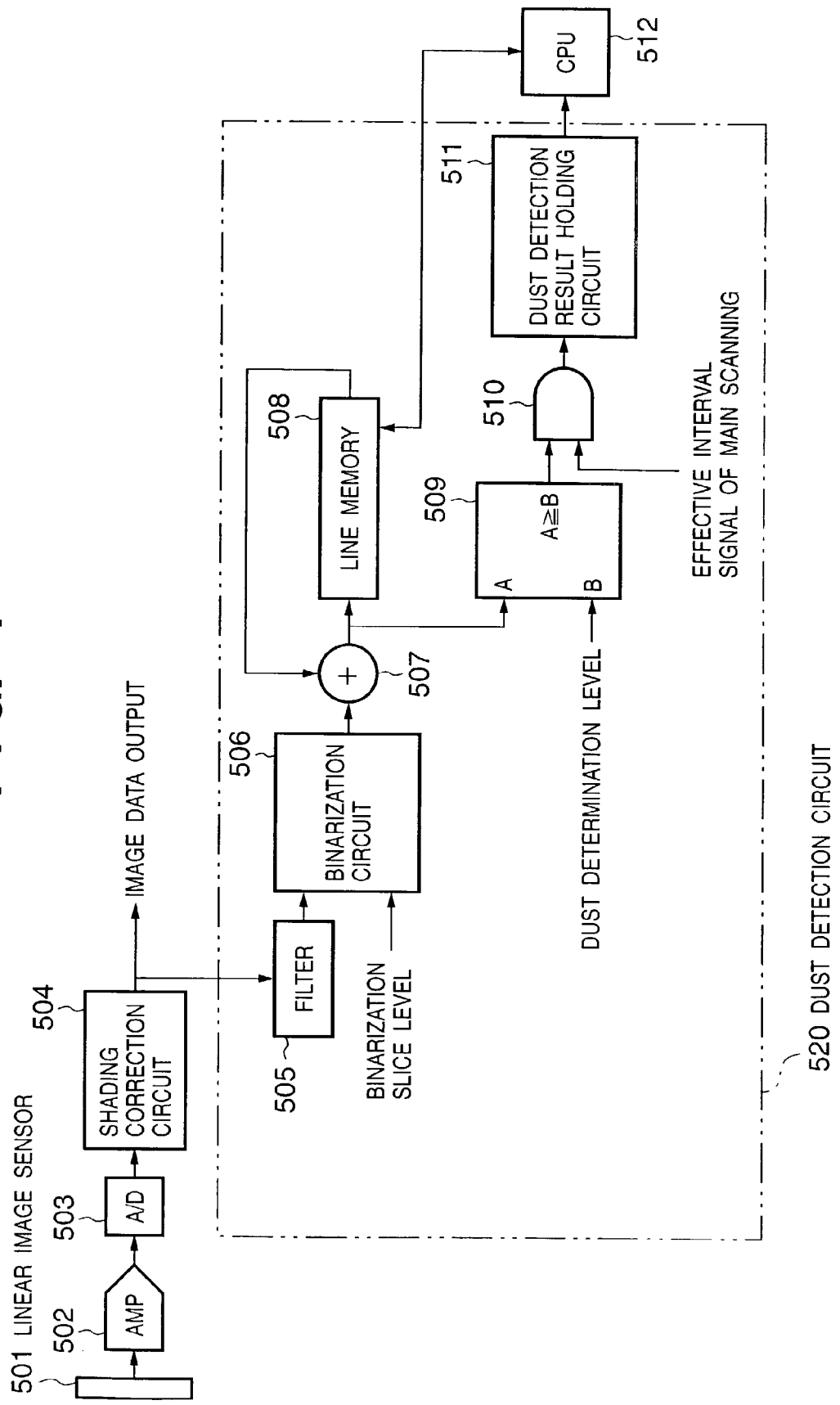

FLOW-SCANNED IMAGE OF AUTOMATIC DOCUMENT FEEDING BELT (WHITE)
[AFTER BINARIZATION]

BLACK PIXEL RATIO

FLOW-SCANNED IMAGE OF AUTOMATIC DOCUMENT FEEDING BELT (WHITE)
[AFTER BINARIZATION]

BLACK PIXEL RATIO

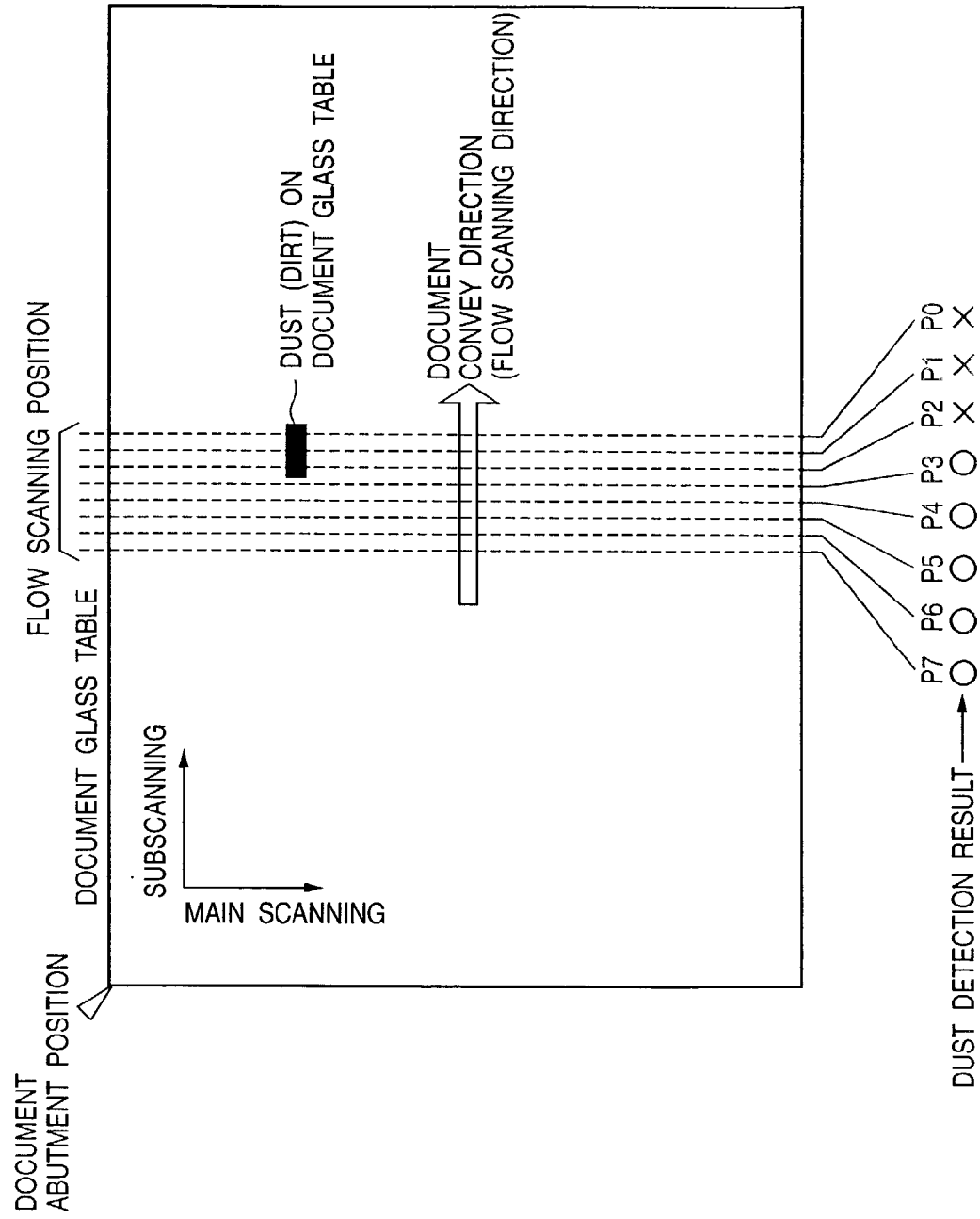

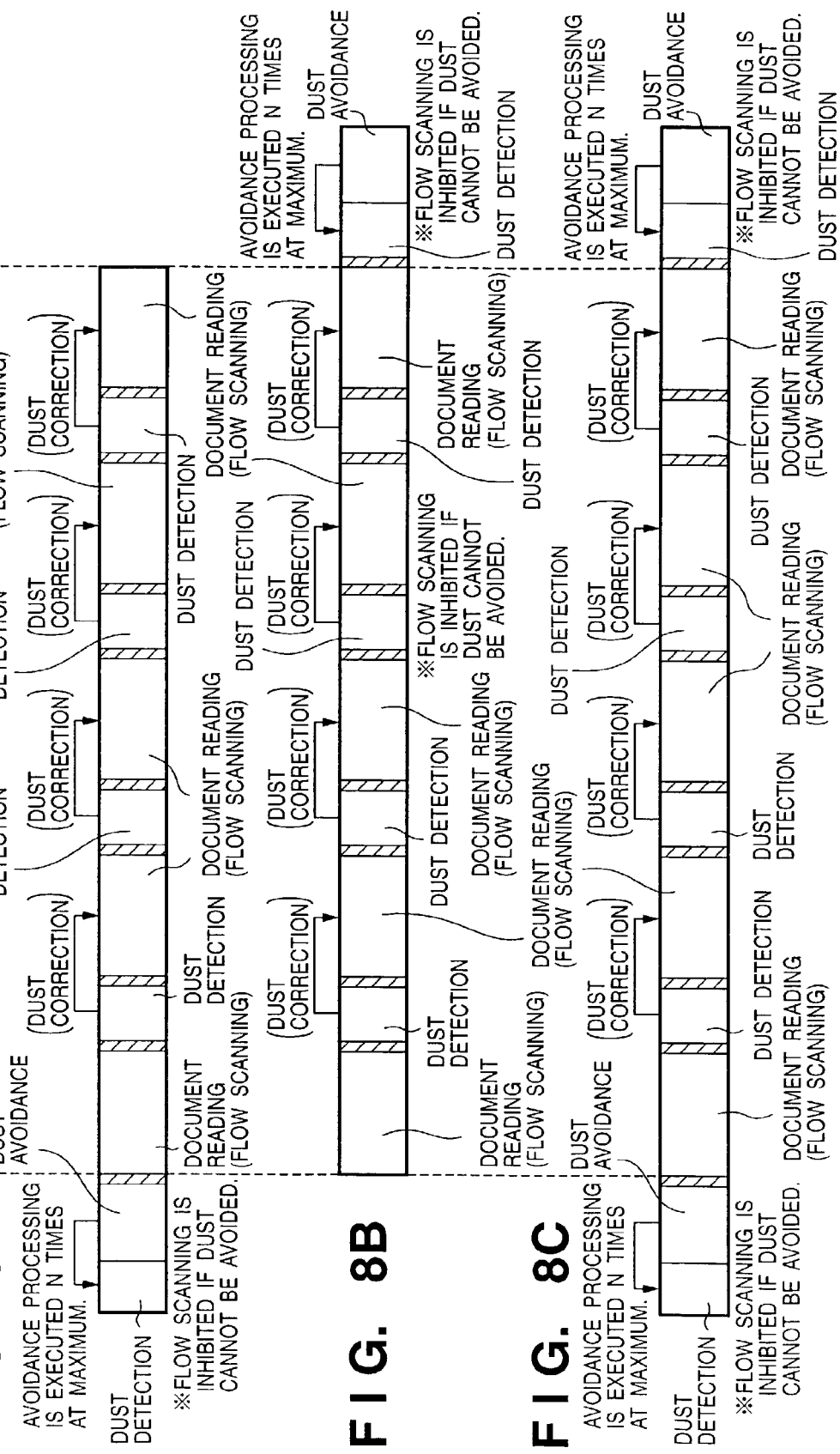

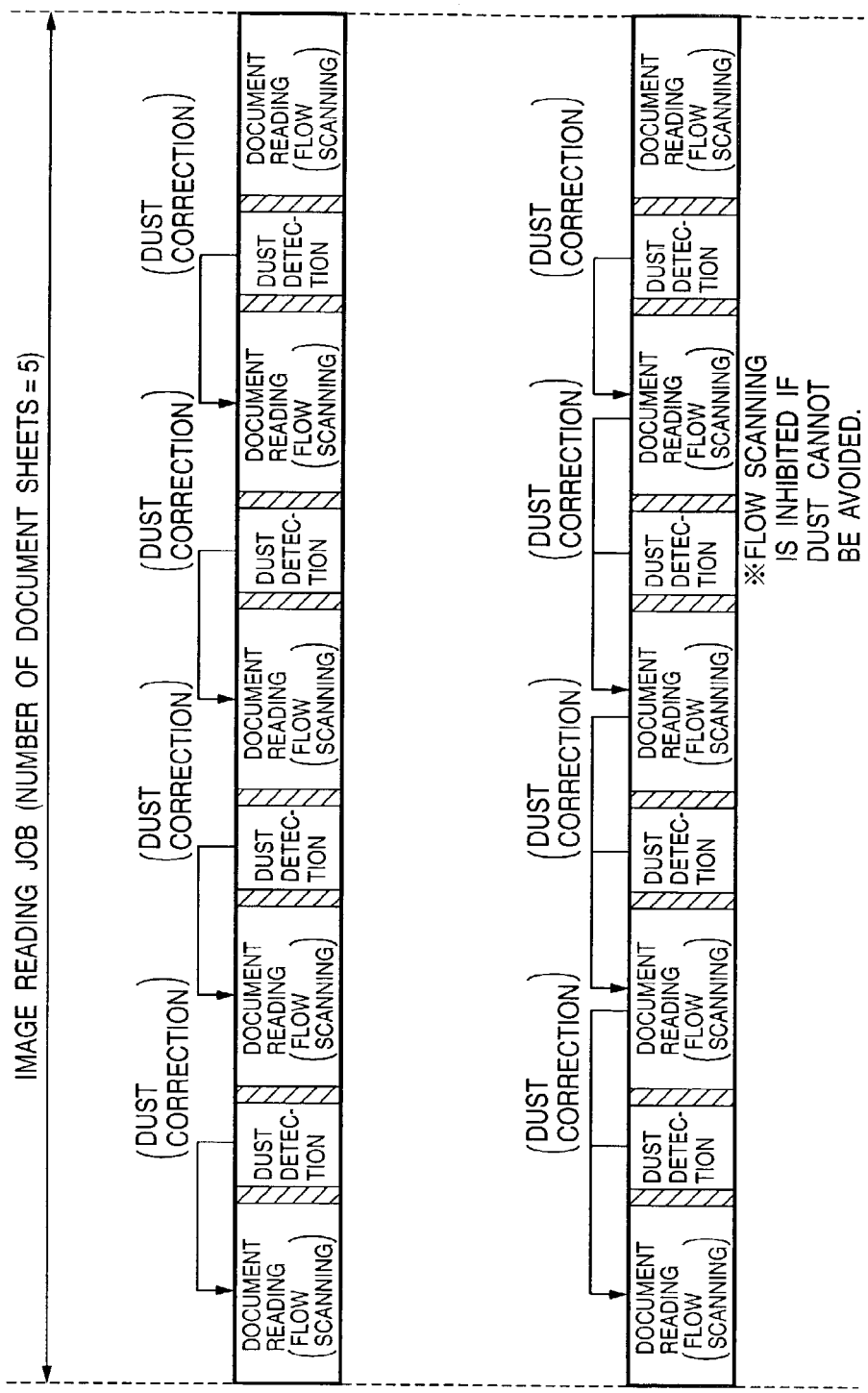

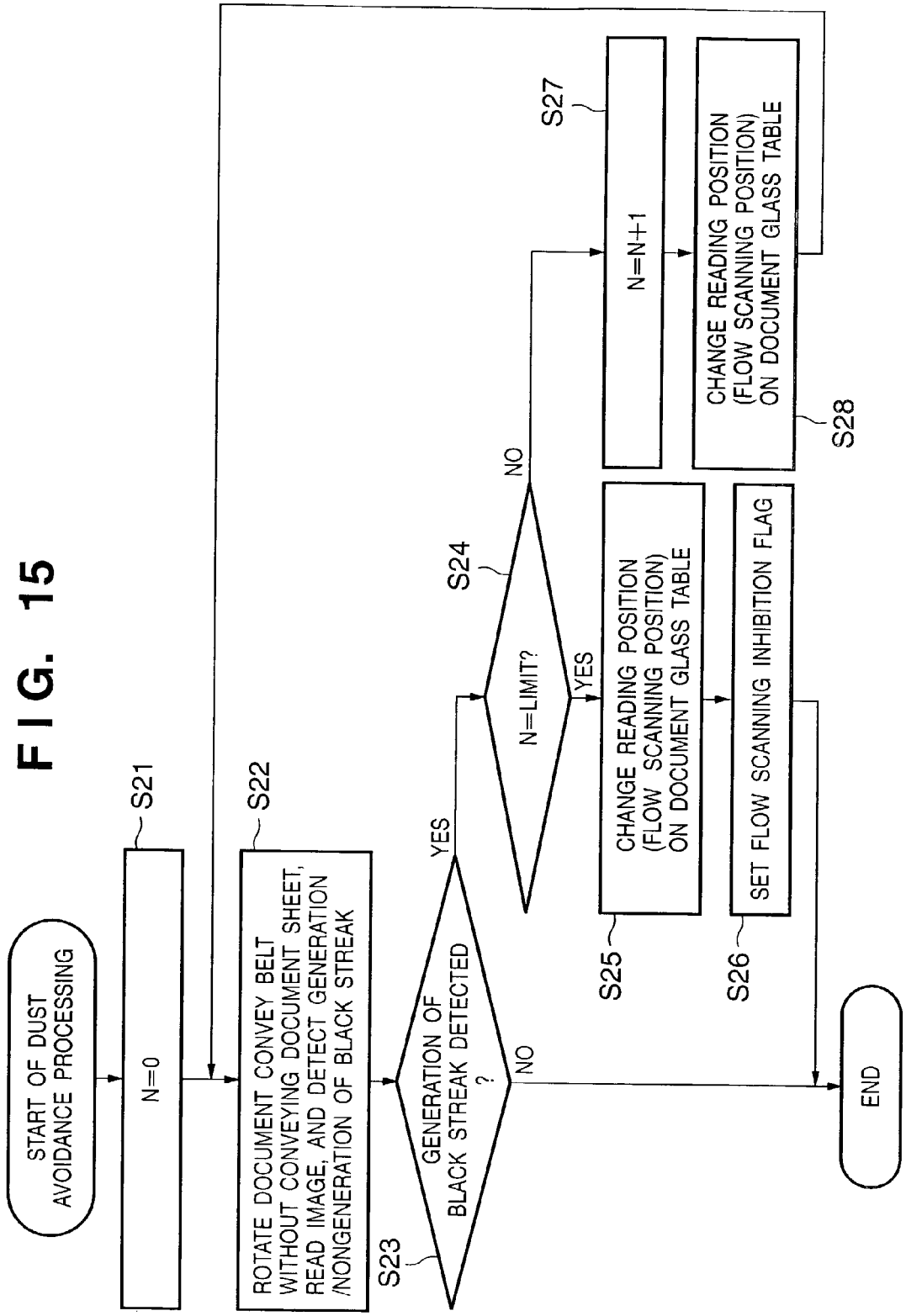

IMAGE READING APPARATUS AND PROGRAM

FIELD OF THE INVENTION

The present invention relates to an image reading apparatus for reading a document image by using a linear image sensor and, more particularly, to an image reading apparatus and program suitable for suppressing or correcting generation of a black streak image caused by dust, dirt, or the like attached to a document glass table in performing flow scanning of reading a document image while moving the document sheet at a predetermined speed by an automatic document feeder attached to the image reading apparatus.

BACKGROUND OF THE INVENTION

A conventional image reading apparatus for reading a document image by using a linear image sensor has an arrangement shown in FIG. 10. In FIG. 10, reference numeral 101 denotes a document illumination lamp; 102 to 104, first to third mirrors; 105, a lens; 106, a linear image sensor; 107, a document glass table; 108, a document sheet; and 109, a white plate serving as a shading correction reference. In the image reading apparatus of FIG. 10, the first to third mirrors 102 to 104 and the document illumination lamp 101 move in directions indicated by arrows in FIG. 10 to perform optical scanning (subscanning), thereby two-dimensionally reading the document sheet 108.

FIG. 11 shows an arrangement when the image reading apparatus shown in FIG. 10 is equipped with an automatic document feeder. The automatic document feeder feeds a plurality of document sheets 108 on a stack tray 201 one by one to the document glass table 107 of the image reading apparatus. The document sheet 108 is conveyed by circularly driving an automatic document feeding belt 202 by driving rollers 203. For descriptive convenience, FIGS. 10 and 11 show two document illumination lamps 101, two first mirrors 102, two second mirrors 103, and two third mirrors 104. In practice, one document illumination lamp 101, one first mirror 102, one second mirror 103, and one third mirror 104 are arranged.

One of image reading modes in which a document image is read by using the image reading apparatus and automatic document feeder is a so-called "flow scanning" mode in which the document sheet 108 moving at a predetermined speed on the document glass table 107 is read without moving the optical system. In the "flow scanning mode", the image reading apparatus moves the first to third mirrors 102 to 104 so as to read a predetermined position of the document glass table 107. In this state (mirror positions are fixed after the mirrors are moved), the automatic document feeder moves the document sheet 108 at a predetermined speed to read the document sheet 108. In this case, the position on the document glass table 107 where the image reading apparatus reads the document sheet 108 is called a "flow scanning position", and is a fixed position as represented by the broken line in FIG. 12. A position Δ in FIG. 12 is a document abutment position. The document sheet 108 is conveyed by the automatic document feeder in a direction indicated by the arrow in FIG. 12.

In the "flow scanning mode" in which a document sheet is read by using the automatic document feeder, the document sheet is merely moved in one direction. This mode has an advantage in that the convey time interval between document sheets sequentially conveyed to the flow scanning position is shorter than that of optical scanning operation when the image reading apparatus successively reads a large number of document sheets.

However, the prior art suffers the following problems. If dust, dirt, or the like is attached to the flow scanning position on the document glass table 107, as shown in FIG. 12, in reading a document sheet in the "flow scanning mode" by the conventional image reading apparatus, a black streak 303 is generated at a corresponding main scanning position of a read image 302 obtained by reading a document image 301 on the document sheet 108 by the linear image sensor. In the prior art, generation of a black streak by dust, dirt, or the like attached to the flow scanning position on the document glass table 107 can only be prevented by cleaning the surface of the document glass table.

SUMMARY OF THE INVENTION

The present invention has been made in consideration of the above situation, and has as its object to provide an image reading apparatus and program capable of greatly reducing generation of a black streak image caused by dust, dirt, or the like at a flow scanning position on a document glass table in flow scanning of reading a document image while moving the document sheet at a predetermined speed.

To achieve the above object, an image reading apparatus according to the present invention has the following arrangement.

That is, an image reading apparatus comprises a reading unit which reads a document image, a detection unit which detects presence/absence of a foreign matter on an optical path during a document nonreading period of the reading unit, a correction unit which performs correction processing for an image signal on the basis of a detection result of the detection unit during document reading of the reading unit, and a control unit which changes a reading position of the reading unit during the document nonreading period of the reading unit so as not to read the foreign matter by the reading unit.

A program according to the present invention has the following steps.

That is, a program causes a computer to execute an image reading method applied to an image reading apparatus having a reading unit which reads a document image, wherein the image reading method comprises the detection step of detecting presence/absence of a foreign matter on an optical path during a document nonreading period of the reading unit, the correction step of performing correction processing for an image signal on the basis of a detection result of the detection step during document reading of the reading unit, and the control step of changing a reading position of the reading unit during the document nonreading period of the reading unit so as not to read the foreign matter by the reading unit.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a block diagram showing an arrangement of a control system mainly constituted by the dust detection circuit of an image reading apparatus according to an embodiment of the present invention;

FIGS. 2A and 2B are explanatory views showing a dust detection operation example of the dust detection circuit of the image reading apparatus according to the embodiment of the present invention, in which FIG. 2A is an explanatory view showing a flow-scanned image on the white surface of an automatic document feeding belt, and FIG. 2B is a graph showing the black pixel ratio;

FIGS. 4A and 4B are explanatory views showing a dust detection operation example of the dust detection circuit of the image reading apparatus according to the modification of the embodiment of the present invention, in which FIG. 4A is an explanatory view showing a flow-scanned image on the white surface of the automatic document feeding belt, and FIG. 4B is a graph showing the black pixel ratio;

FIGS. 6A and 6B are explanatory views showing a dust correction operation example of the dust detection and dust correction circuits of the image reading apparatus according to the embodiment of the present invention, in which FIG. 6A is an explanatory view when the number of dust-detected pixels is one, and FIG. 6B is an explanatory view when the number of dust-detected pixels is two;

FIG. 7 is an explanatory view showing a dust avoidance processing operation example of the image reading apparatus according to the embodiment of the present invention;

FIGS. 8A to 8C are explanatory views showing control examples of dust detection/dust correction/dust avoidance processing in the image reading apparatus according to the embodiment of the present invention;

FIGS. 9A and 9B are explanatory views showing control examples of dust detection/dust correction processing in the image reading apparatus according to the embodiment of the present invention;

FIG. 15 is a flow chart for explaining the flow of dust avoidance processing in step S3 of FIG. 13.

DETAILED DESCRIPTION OF THE PREFERRED EMBODIMENTS

Figure 2A:
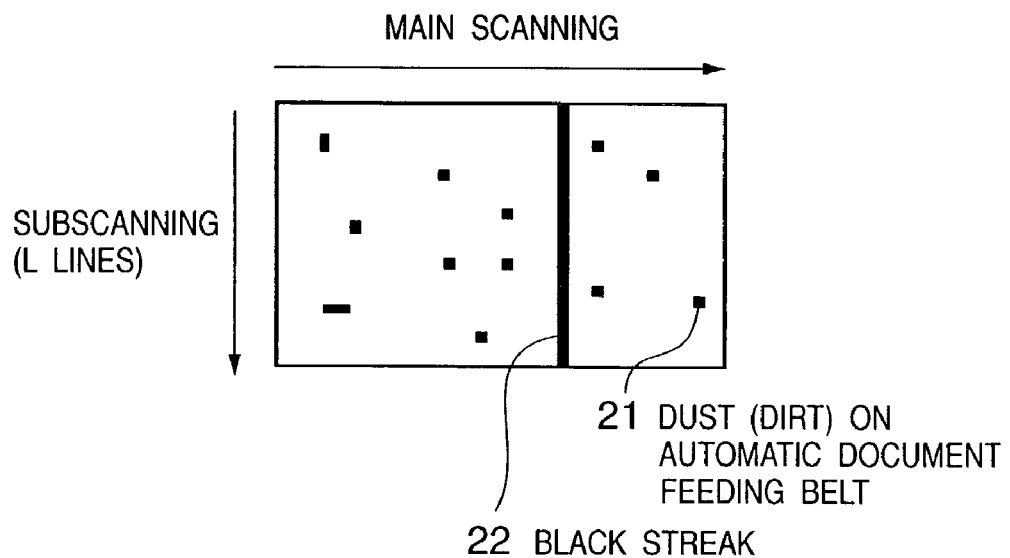

The outline of the present invention will be explained before a description of embodiments of the present invention. An image reading apparatus according to the present invention comprises a dust detection function of detecting dust or dirt on a document glass table. The image reading apparatus performs dust detection processing of detecting dust or dirt on the document glass table during a document nonreading period other than a document reading period. The apparatus executes dust correction processing based on the dust detection result during continuous document reading. During an interval between the end of a series of image reading jobs (to be referred to as JOBs hereinafter) and the next image reading JOB, the apparatus performs dust avoidance processing of changing the flow scanning position to a position free from any dust on the document glass table by using the dust detection function. If dust is difficult to avoid, the apparatus inhibits flow scanning and executes control of switching flow scanning to optical scanning document reading.

FIGS. 8A to 8C are explanatory views showing examples of a series of control operations including "dust detection", "dust correction", "dust avoidance", ... in the image reading apparatus of the present invention. In FIGS. 8A to 8C, the image reading apparatus executes dust detection processing (details of which will be described later) of detecting dust on the document glass table during the document nonreading period between document sheets in, e.g., an image reading JOB of reading five document sheets. If the dust detection result reveals the presence of dust on the document glass table, the apparatus executes dust correction processing (details of which will be described later) for the next document reading. The examples of FIGS. 8A to 8C are the same up to this processing.

In FIG. 8A, dust on the document glass table is detected at the start of an image reading JOB. Processing of avoiding dust is achieved such that a mirror table (optical system) which supports a mirror for guiding light reflected by a document sheet is moved by a driving unit (not shown) to a flow scanning position where no dust is detected on the document glass table in advance. At this time, dust avoidance processing is repeated N times at maximum (i.e., the flow scanning position is changed to N portions at maximum). If dust cannot be avoided by N dust avoidance processes, i.e., it is determined that dust cannot be avoided, flow scanning itself is inhibited, and control of automatically switching flow scanning to a normal document reading mode using optical scanning is performed. In this case, the flow scanning inhibition state is cleared by a means (not shown) for clearing the flow scanning inhibition state (flow scanning inhibition flag).

In FIG. 8B, dust on the document glass table is detected at the end of an image reading JOB. Avoidance processing of preventing the influence of dust in next and subsequent flow scanning operations is performed by moving the mirror table by the driving unit (not shown) to a flow scanning position where no dust is detected on the document glass table. At this time, dust avoidance processing is repeated N times at maximum (i.e., the flow scanning position is changed to N portions at maximum). If dust cannot be avoided by N dust avoidance processes, i.e., it is determined that dust cannot be avoided, flow scanning itself is inhibited, and next and subsequent document reading operations are done by normal optical scanning. Also in this case, the flow scanning inhibition state is cleared by a means (not shown) for clearing the flow scanning inhibition state (flow scanning inhibition flag).

FIG. 8C shows control which is a combination of FIGS. 8A and 8B. Dust avoidance processing is executed both at the start and end of an image reading JOB.

FIGS. 9A and 9B are explanatory views showing other control examples of dust correction processing performed during the image reading JOB of FIGS. 8A to 8C in the image reading apparatus of the present invention. FIG. 9A shows control when the result of dust detection on the document glass table that is executed during a document nonreading period corresponding to an interval between document reading operations is used for dust correction of an immediately preceding read image. FIG. 9B shows control when dust detection results (dust detection addresses) before and after reading each document sheet are used for dust correction.

The outline of the present invention has been described. A dust detection operation example, dust correction operation example, and dust avoidance processing example in the image reading apparatus according to an embodiment of the present invention will be explained in detail with reference to the accompanying drawings.

[1] Dust Detection Operation

Figure 11:
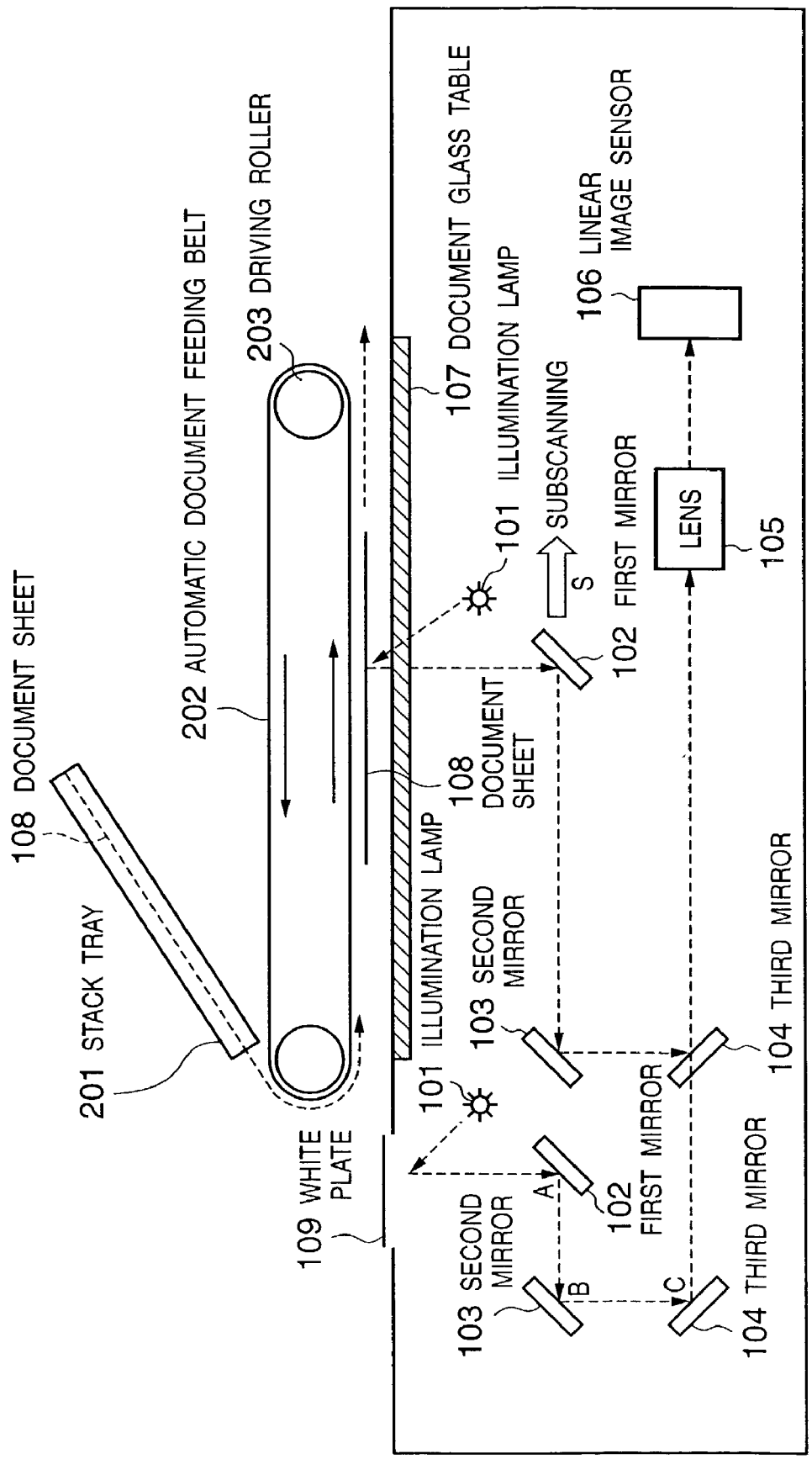
FIG. 11 is a view showing another arrangement of the image reading apparatus equipped with a conventional automatic document feeder.
Figure 12:
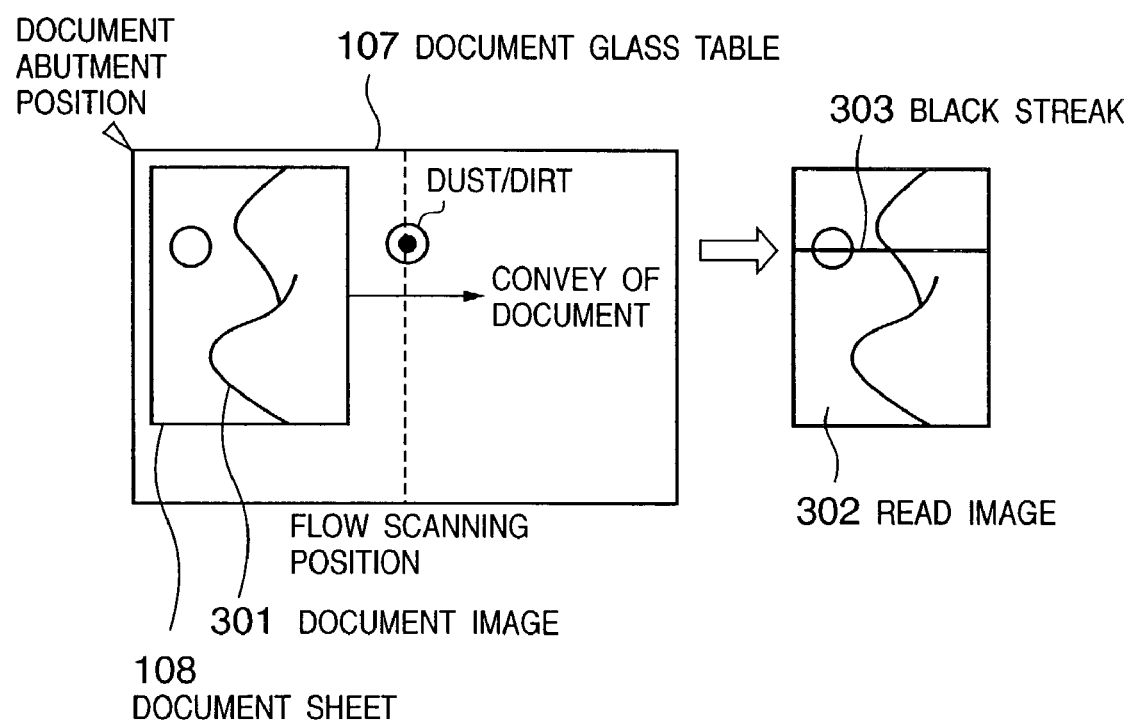
FIG. 12 is an explanatory view showing the influence of dust attached to the document glass table of the conventional image reading apparatus on flow scanning.

The image reading apparatus according to the embodiment of the present invention comprises a document illumination lamp for illuminating a document, a driving unit for moving and stopping a mirror table (optical system) for guiding light reflected by a document sheet to a linear image sensor, and a linear image sensor (reading unit) for reading a document image on the basis of light reflected by the document illuminated by the document illumination lamp. The image reading apparatus according to the embodiment of the present invention is equipped with an automatic document feeder as shown in FIG. 11. The image reading apparatus has a "flow scanning mode" in which a plurality of document sheets on a stack tray are fed one by one to the document glass table by circularly driving an automatic document feeding belt (convey unit) by driving rollers, and the document sheet is read while it is moved at a predetermined speed on the document glass table in the subscanning direction.

FIG. 1 is a block diagram showing an arrangement of a control system mainly constituted by the dust detection circuit of the image reading apparatus according to the embodiment of the present invention. The control system of the image reading apparatus comprises a linear image sensor 501, amplifier 502, A/D converter 503, shading correction circuit 504, dust detection circuit 520, and CPU 512. The dust detection circuit 520 has a filter circuit 505, binarization circuit 506, addition circuit 507, line memory 508, comparator 509, AND circuit 510, and dust detection result holding circuit 511.

This arrangement will be explained in detail. The linear image sensor 501 forms light reflected by a document sheet illuminated by the document illumination lamp into an image via a mirror and lens, and photoelectrically converts the light reflected by the document sheet into an electrical signal. The amplifier 502 amplifies an output signal from the linear image sensor 501. The A/D converter 503 converts an analog signal output from the amplifier 502 into a digital signal. The shading correction circuit 504 performs known shading correction processing for an output signal from the A/D converter 503. The CPU 512 is a central processing unit for integrally controlling the respective units of the control system. The CPU 512 performs control of determining a dust detection result on the basis of an output from the dust detection result holding circuit 511 of the dust detection circuit 520, and control of comparing data stored in the line memory 508 with a dust determination level.

The dust detection circuit 520 executes dust detection processing of detecting whether a foreign matter such as dust is attached to the document glass table. In the dust detection circuit 520, the filter circuit 505 performs processing of, e.g., emphasizing the RF component of an image signal having undergone shading correction. The binarization circuit 506 performs pre-processing for facilitating detection of the influence (black streak) of dust attached to the document glass table. The binarization circuit 506 binarizes an image signal output from the filter circuit 505 into white/black. The addition circuit 507 adds an output signal from the binarization circuit 506 and an output signal from the line memory 508, and supplies the sum to the line memory 508. The line memory 508 stores read image data of a predetermined number of lines.

The comparator 509 compares the level (level at an input terminal A) of an output signal from the addition circuit 507 with a dust determination level (level at an input terminal B), and for A≧B, outputs a signal to the AND circuit 510. The AND circuit 510 ANDs the output signal from the comparator 509 and the effective image interval signal of main scanning, and outputs the AND signal to the dust detection result holding circuit 511. The dust detection result holding circuit 511 holds a dust detection result when the dust detection result of even one pixel exhibits the presence of dust (when a foreign matter such as dust is attached to the document glass table) on the basis of the output signal from the AND circuit 510.

The operation of the dust detection circuit 520 in the image reading apparatus will be described. The filter circuit 505 performs processing of, e.g., emphasizing the RF component of an image signal having undergone shading correction. The binarization circuit 506 performs pre-processing for facilitating detection of the influence (black streak) of dust. FIG. 2A is an explanatory view of a flow-scanned image showing a state in which an automatic document feeding belt for conveying a document sheet is rotated in flow scanning, the white surface of the rotating automatic document feeding belt is read by the linear image sensor 501, and the read data is binarized by the binarization circuit 506 via the filter circuit 505. As shown in FIG. 2A, the influence of dust or dirt on the document glass table appears as a black streak 22 even after binarization. Scattered black points 21 represent the influence of dust or dirt attached to the white surface of the automatic document feeding belt.

Figure 2B:
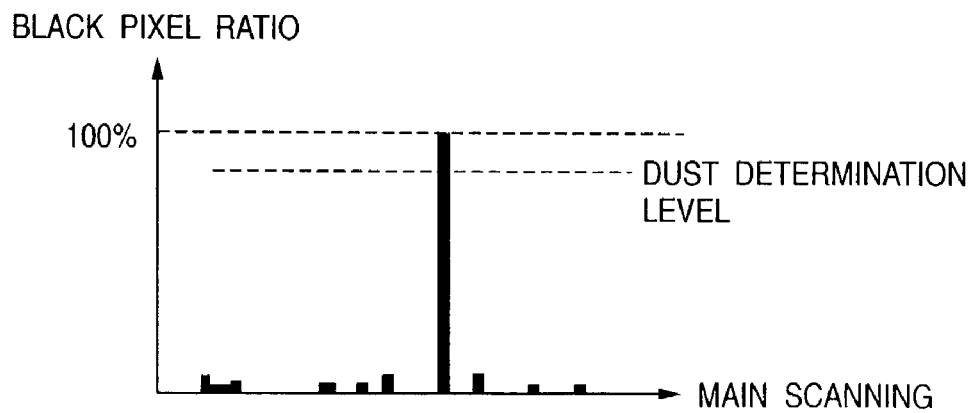

Binarized image signals having the same address in the main scanning direction are accumulated and added by a predetermined number of lines by the addition circuit 507 and line memory 508 (this operation will be called sampling addition hereinafter). FIG. 2B is a graph showing the ratio of black pixels to main scanning positions as a result of sampling addition. As shown in FIG. 2B, the black pixel ratio is 100% at a position where a black streak is generated. To the contrary, the influence of dust or dirt attached to the white surface of the automatic document feeding belt exhibits a low black pixel ratio. Hence, a main scanning position where the black pixel ratio becomes higher than a predetermined black pixel ratio (dust determination level) can be determined as a dust position on the document glass table.

The comparator 509 compares a value corresponding to the dust determination level with a sampling addition result, and performs dust determination of checking whether dust is attached to the document glass table. The AND circuit 510 enables the dust determination result (dust detection result) in only the effective image section of main scanning. When the dust determination result (dust detection result) of even one pixel represents the presence of dust, the dust detection result holding circuit 511 holds the result. The CPU 512 monitors an output from the dust detection result holding circuit 511 to obtain the dust detection result. The CPU 512 can also monitor the storage contents of the line memory 508. An address in the main scanning direction that corresponds to dust detection can also be attained by comparing data stored in the line memory 508 with the dust detection level. The address in the main scanning direction can be used as the address of a dust-detected pixel (to be described later).

Figure 3:
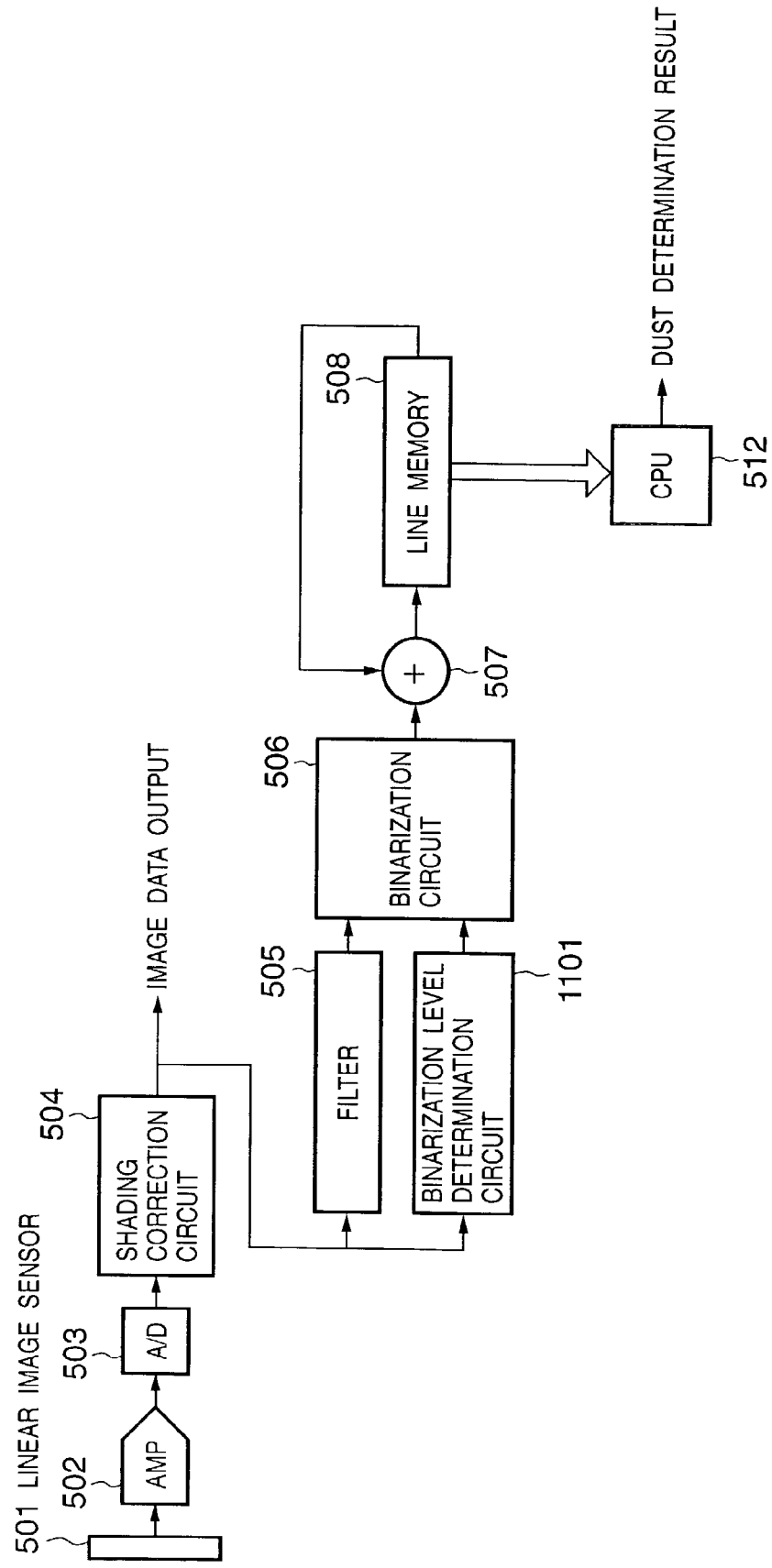
FIG. 3 is a block diagram showing an arrangement of a control system mainly constituted by the dust detection circuit of the image reading apparatus according to a modification of the embodiment of the present invention.

FIG. 3 is a block diagram showing an arrangement of a control system mainly constituted by the dust detection circuit of the image reading apparatus according to a modification of the embodiment of the present invention. The control system of the image reading apparatus comprises the linear image sensor 501, the amplifier 502, the A/D converter 503, the shading correction circuit 504, the dust detection circuit, and the CPU 512. The dust detection circuit has the filter circuit 505, the binarization circuit 506, the addition circuit 507, the line memory 508, and a binarization level determination circuit 1101. The arrangement of FIG. 3 other than the dust detection circuit is the same as that of FIG. 1, and a description thereof will be omitted.

The basic operation of the dust detection circuit in FIG. 3 is almost the same as the operation of the dust detection circuit in FIG. 1 except that the binarization level determination circuit 1101 determines a binarization slice level used by the binarization circuit 506 on the basis of image data output from the shading correction circuit 504. This mechanism prevents erroneously determining the color of the white surface as black owing to discoloration or contamination of the white surface of the automatic document feeding belt upon changes over time. For example, a value obtained by performing predetermined calculation for the average of read image signals is output as the binarization slice level. The predetermined calculation includes calculation of adding/subtracting a predetermined value to/from the image average level, calculation of multiplying a predetermined value, or calculation as a combination of them.

Figure 4A:
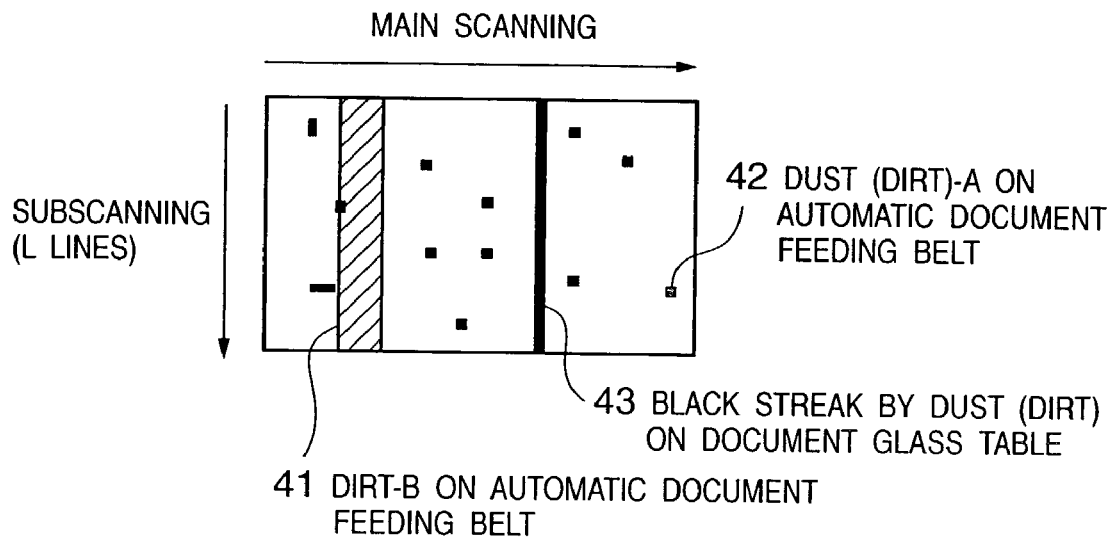
Figure 4B:
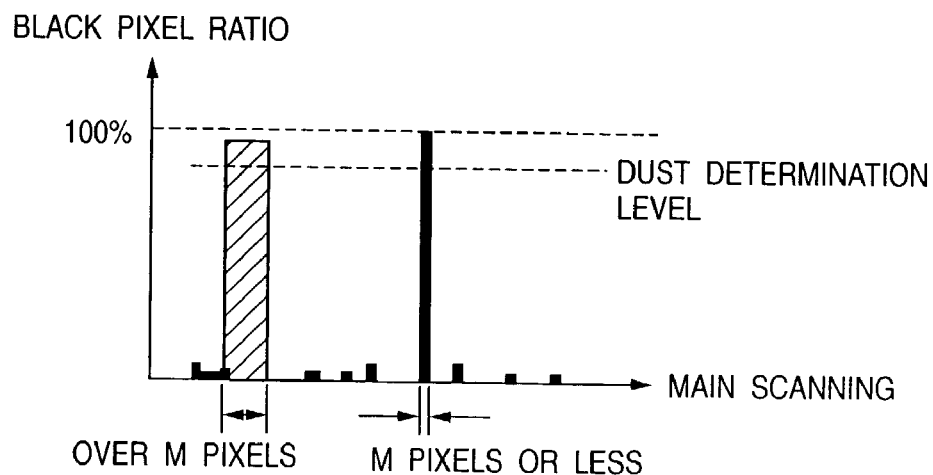

The automatic document feeding belt may be locally contaminated against such measure. This state is represented by "dirt-B on the automatic document feeding belt" 41 in FIG. 4A. In FIG. 4A, reference numeral 42 denotes "dust (dirt)-A on the automatic document feeding belt"; and 43, a "black streak by dust (dirt) on the document glass table". In this case, the black pixel ratio after binarization shown in FIG. 4B exceeds the dust determination level even if black pixels are generated by dirt on the automatic document feeding belt. Local dirt on the automatic document feeding belt spreads over N pixels in a wider range than small dust (dirt) on the document glass table, as shown in FIG. 4B.

From this, the CPU 512 looks up the storage contents of the line memory 508, and if addresses in the main scanning direction where the black pixel ratio exceeds the dust determination level are successive over a predetermined value M, can determines that the dust is not dust (dirt) on the document glass table but dirt on the automatic document feeding belt. On the contrary, the CPU 512 looks up the storage contents of the line memory 508, and only when addresses in the main scanning direction where the black pixel ratio exceeds the dust determination level are successive by M pixels or less, can determines that dust (dirt) exists at portions on the document glass table that corresponds to the positions of the addresses. This can prevent erroneously determining dirt on the automatic document feeding belt as dust (dirt) on the document glass table.

Figure 13:
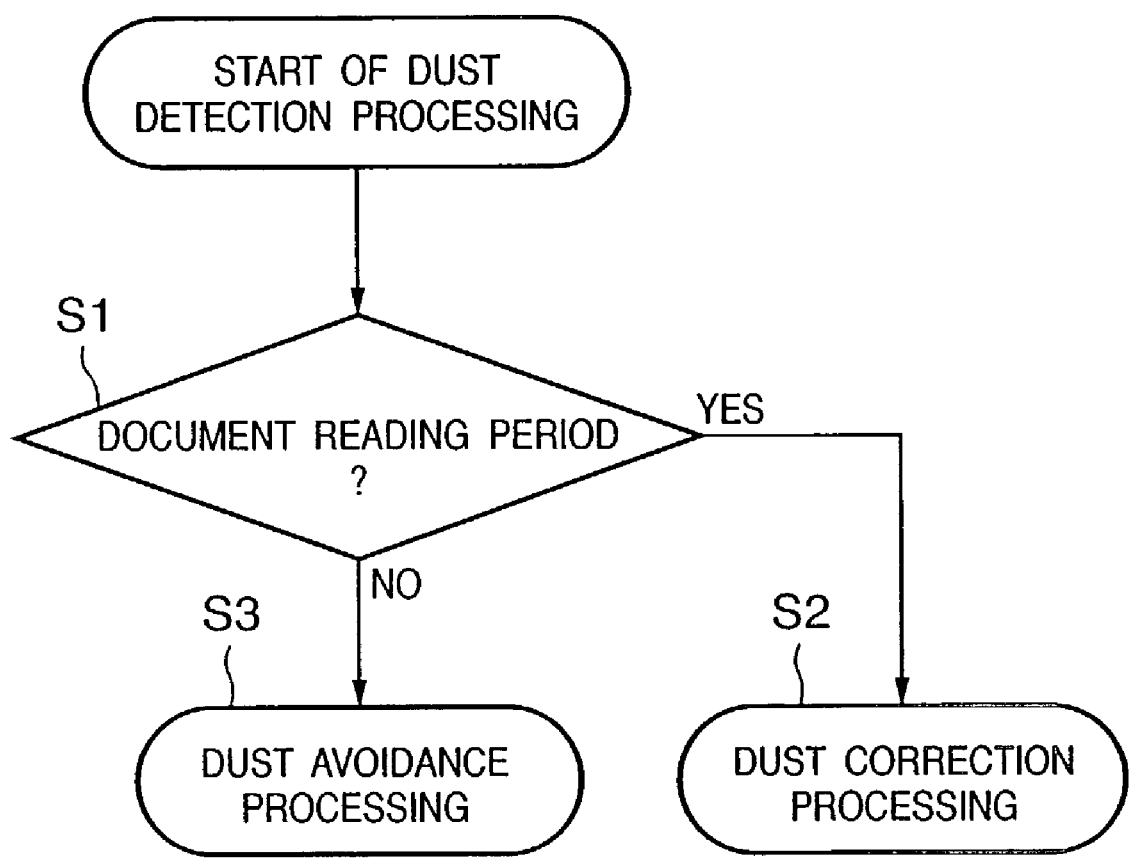
FIG. 13 is a flow chart showing the flow of dust detection processing of detecting a foreign matter such as dust or dirt on the document glass table.

FIG. 13 is a flow chart showing the flow of dust detection processing of detecting a foreign matter such as dust or dirt on the document glass table. The flow shown in FIG. 13 is executed by the CPU 512. In step S1, the CPU 512 checks whether the current state is a document reading period (reading JOB is being executed). If Y in step S1, the CPU 512 advances to step S2 to execute dust correction processing; if N, to step S3 to execute dust avoidance processing.

[2] Dust Correction Operation

Figure 14:
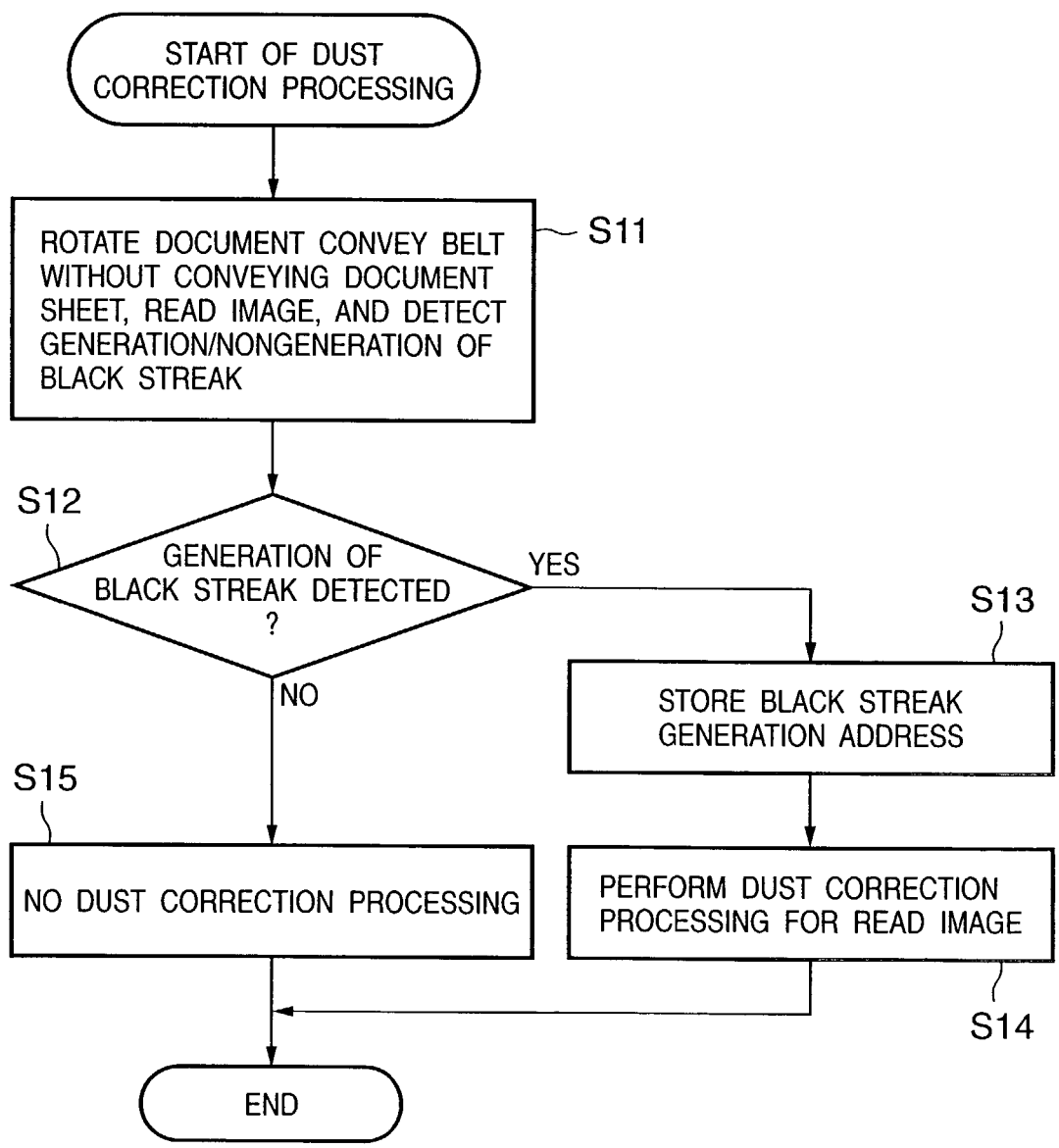
FIG. 14 is a flow chart for explaining the flow of dust correction processing in step S2 of FIG. 13.

FIG. 14 is a flow chart for explaining the flow of dust correction processing in step S2 of FIG. 13. The flow shown in FIG. 14 is executed by the CPU 512.

In step S11, a document conveyor belt (automatic document feeding belt) is rotated, and an image on the rotating conveyor belt is read to detect whether a black streak has been generated by a foreign matter such as dust. In step S12, the CPU 512 cheeks whether generation of the black streak has been detected in step S11. If Y in step S12, the CPU 512 shifts to step S13 to store the black streak generation address; if N, to step S15 to end the flow without executing dust correction processing.

Figure 5:
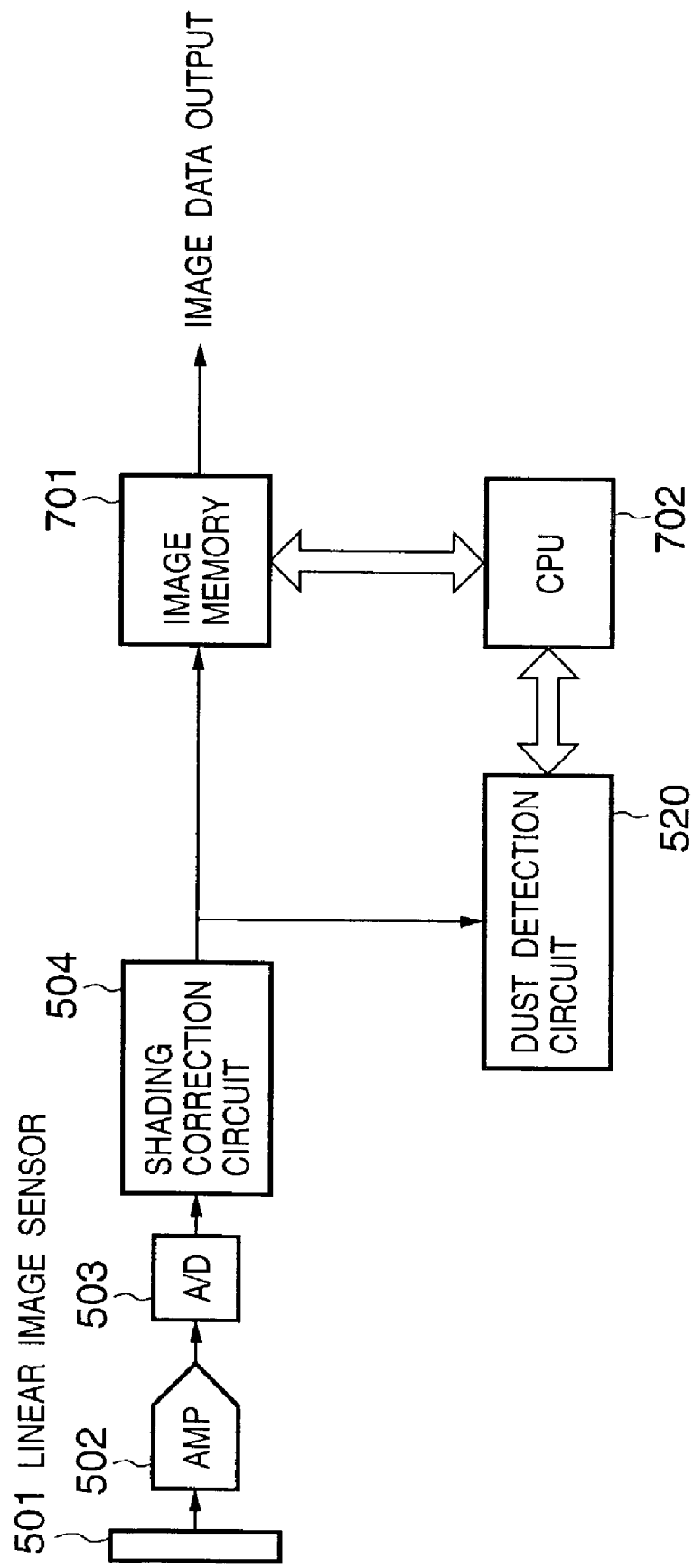
FIG. 5 is a block diagram showing an arrangement of a control system mainly constituted by the dust detection and dust correction circuits of the image reading apparatus according to the embodiment of the present invention.

FIG. 5 is a block diagram showing an arrangement of a control system mainly constituted by the dust detection and dust correction circuits of the image reading apparatus according to the embodiment of the present invention. The control system of the image reading apparatus comprises the linear image sensor 501, the amplifier 502, the A/D converter 503, the shading correction circuit 504, the dust detection circuit 520, an image memory 701, and a CPU 702. The arrangement of FIG. 5 other than the image memory 701 and CPU 702 is the same as that of FIG. 1, and a description thereof will be omitted. Dust detection operation is the same as the above-described dust detection operation, and a description thereof will be omitted.

In FIG. 5, image data obtained by reading a document sheet by the linear image sensor 501 and performing shading correction by the shading correction circuit 504 is stored in the image memory 701 via the amplifier 502 and A/D converter 503. The CPU 702 executes dust correction processing for a pixel at a main scanning address where dust is detected by the dust detection circuit 520.

Figure 6A:
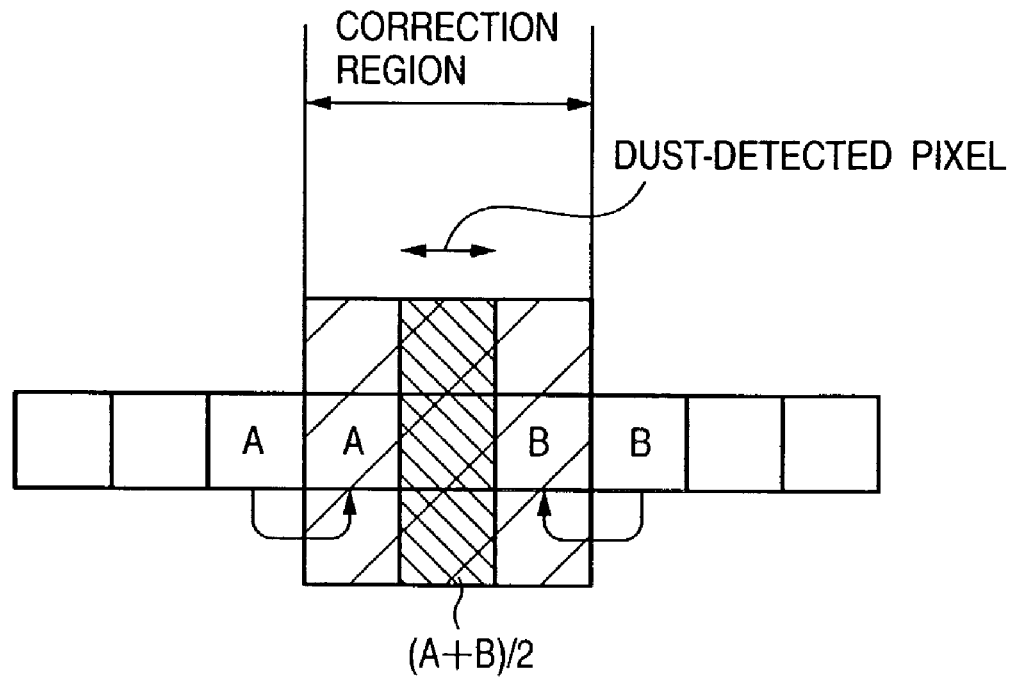
Figure 6B:
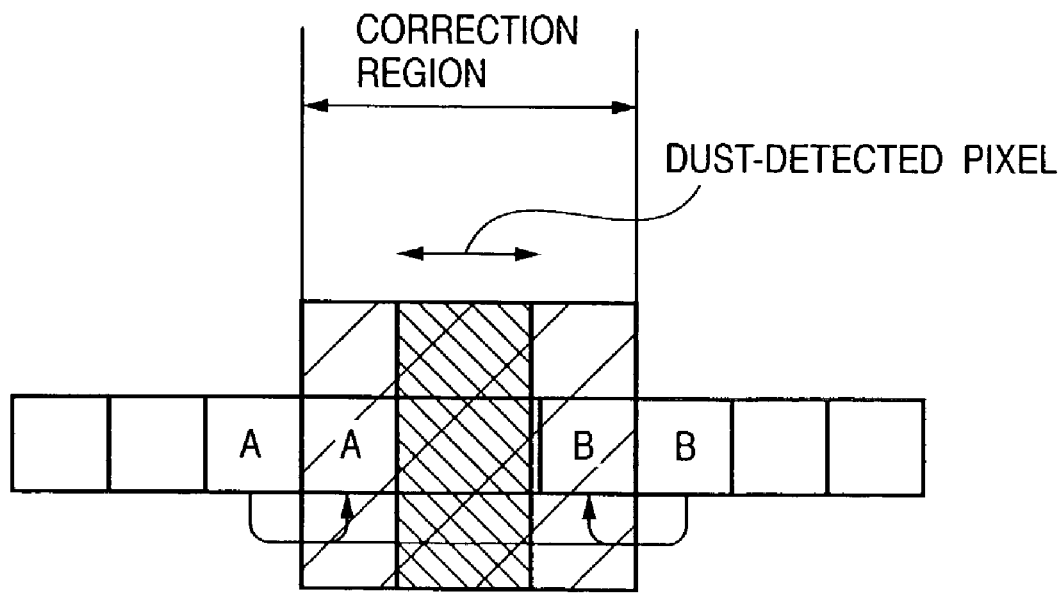
Figure 10:
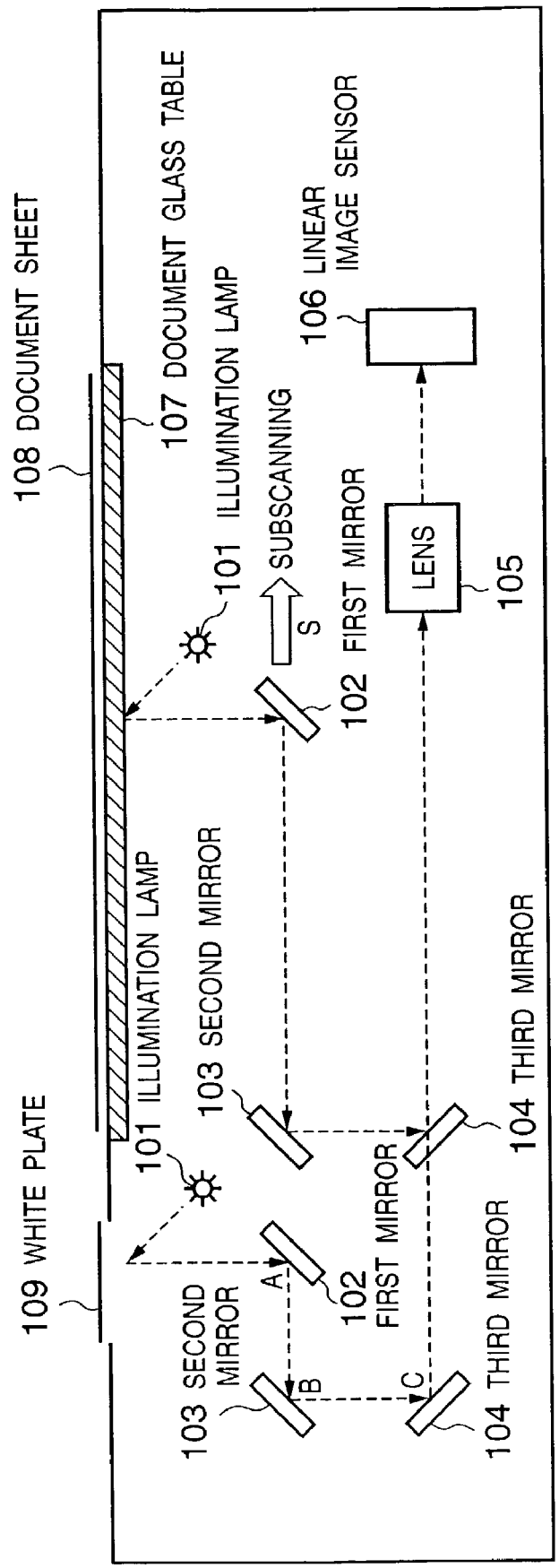
FIG. 10 is a view showing an arrangement of a conventional image reading apparatus.

Dust correction processing is realized by interpolating or replacing a pixel subjected to dust correction processing by peripheral pixels. FIGS. 6A and 6B are explanatory views showing dust correction operation examples. In the dust correction operation examples of FIGS. 6A and 6B, pixels in a dust correction region obtained by adding right and left pixels each to a dust-detected pixel detected by the dust detection circuit 520 are interpolated or replaced by left and right pixel data A and B shown in FIGS. 6A and 6B. The number of dust-detected pixels is one in FIG. 6A, and two in FIG. 6B. Dust correction processing can be achieved by various methods in addition to the examples shown in FIGS. 6A and 6B, and is executed not only by the CPU 512 but also by a predetermined logic circuit.

[3] Dust Avoidance Processing

FIG. 15 is a flow chart for explaining the flow of dust avoidance processing in step S3 of FIG. 13. In dust avoidance processing, the flow scanning position where a document image is read is shifted while the document sheet is moved at a predetermined speed on the document glass table in the image reading apparatus. At this time, dust is detected at the flow scanning position on the document glass table, and a flow scanning position free from any dust is searched for.

In step S21 of FIG. 15, "0" is set as a value N of a counter for counting the number of dust avoidance processes. The flow shifts to step S22, the document convey belt (automatic document feeding belt) is rotated, and an image on the rotating convey belt is read to detect whether a black streak has been generated.

In step S23, whether generation of the black streak has been detected in step S22 is checked. If Y in step S23, the flow shifts to step S24 to check whether the count value N is a limit value. If Y in step S24, the flow advances to step S25 to change the reading position (flow scanning position) on the document glass table. Then, the flow shifts to step S26 to set a flow scanning inhibition flag.

If N in step S24, the count value is incremented by 1. The reading position (flow scanning position) on the document glass table is changed in step S28, and the flow returns to step S22. The flow shown in FIG. 15 is executed by the CPU 512.

FIG. 7 is an explanatory view showing a dust avoidance processing operation example. In FIG. 7, a total of eight flow scanning positions P0 to P7 exist on the document glass table. When dust is detected at the flow scanning positions P0, P1, and P2, as shown in FIG. 7, any one of the remaining flow scanning positions P3 to P7 is set as a subsequent flow scanning position. To reliably avoid the influence of dust on the document glass table, a position such as the flow scanning position P3 adjacent to a dust-detected flow scanning position is not used. More specifically, flow scanning positions including even an adjacent flow scanning position such as the flow scanning position P3 where no dust is detected are treated as dust avoidable flow scanning positions.

When a dust nonavoidance flag (not shown) representing that dust on the document glass table cannot be avoided is set ON as a result of dust avoidance, the CPU 512 (or CPU 702) of the image reading apparatus performs control of displaying on the display unit (not shown) of the image reading apparatus a cleaning message which prompts cleaning of the document glass table, a warning message representing a warning, or an error message representing an error.

If the dust nonavoidance flag is set ON as a result of dust avoidance, the CPU 512 (or CPU 702) of the image reading apparatus inhibits the "flow scanning mode" in which a document image is read while the document sheet is moved at a predetermined speed, and switches to control of reading a document sheet by optical scanning operation without moving the document sheet on the document glass table. When the "flow scanning mode" is inhibited, the CPU 512 (or CPU 702) executes control of displaying on the display unit a message that dust or dirt is attached to the document glass table. The CPU 512 (or CPU 702) has a function of forcibly clearing (OFF) the dust nonavoidance flag.

As described above, according to the embodiment of the present invention, the CPU 512 (or CPU 702) of the image reading apparatus performs dust detection processing of detecting dust or dirt on the document glass table by the dust detection circuit 520 during a document nonreading period other than a document reading period. While document sheets are successively read, the CPU 512 (or CPU 702) performs dust correction processing on the basis of the dust detection result. During an interval between the end of a series of image reading JOBs and the next image reading JOB, the CPU 512 (or CPU 702) performs dust avoidance processing of changing the flow scanning position to a position free from any dust on the document glass table by using the dust detection function. If dust is difficult to avoid, the CPU 512 (or CPU 702) inhibits flow scanning and executes control of switching flow scanning to optical scanning document reading. This image reading apparatus yields the following effect.

The image reading apparatus can greatly reduce generation of a black streak image caused by dust, dirt, or the like at the flow scanning position on the document glass table in flow scanning of reading a document image while moving the document sheet at a predetermined speed.

[Other Embodiment]

The above embodiment of the present invention has exemplified dust detection, dust correction, and dust avoidance in the image reading apparatus. The present invention is not limited to the image reading apparatus, and can also be applied to dust detection, dust correction, and dust avoidance in an image copying apparatus having an image reading function and image forming function, or dust detection, dust correction, and dust avoidance in a composite machine having a plurality of functions such as an image reading function, image forming function, and image communicating function.

The present invention may be applied to a system constituted by a plurality of devices or an apparatus comprising a single device. The present invention is also achieved when a medium such as a storage medium which stores software program codes for realizing the functions of the above-described embodiment is supplied to a system or apparatus and the computer (or the CPU or MPU) of the system or apparatus reads out and executes the program codes stored in the medium such as a storage medium.

In this case, the program codes read out from the medium such as a storage medium realize the functions of the above-described embodiment, and the medium such as a storage medium which stores the program codes constitutes the present invention. The medium such as a storage medium for supplying the program codes includes a floppy® disk, hard disk, optical disk, magnetooptical disk, CD-ROM, CD-R, magnetic tape, nonvolatile memory card, ROM, or a downloading means via a network.

The functions of the above-described embodiment are realized when the computer executes the readout program codes. Also, the functions of the above-described embodiment are realized when an OS running on the computer performs part or all of actual processing on the basis of the instructions of the program codes. This case is also included in the present invention.

The functions of the above-described embodiment are also realized when the program codes read out from the medium such as a storage medium are written in the memory of a function expansion board inserted into the computer or the memory of a function expansion unit connected to the computer, and the CPU of the function expansion board or function expansion unit performs part or all of actual processing on the basis of the instructions of the program codes. This case is also included in the present invention.

As has been described above, the image reading apparatus of the above embodiment comprises a detection unit for detecting the presence/absence of dust or dirt on the document glass table on the basis of an image signal output from a reading unit. The image reading apparatus executes detection processing by the detection unit in a period during which no document sheet is read by the reading unit. While a document sheet is read by the reading unit, the image reading apparatus performs correction processing for an image signal on the basis of the detection result of the detection unit. In a period during which no document is read by the reading unit, the apparatus performs avoidance processing of changing the reading position of the reading unit to a position free from any dust or dirt on the document glass table. The image reading apparatus can greatly reduce generation of a black streak image caused by dust, dirt, or the like attached to the flow scanning position on the document glass table in flow scanning of reading a document image while moving the document sheet at a predetermined speed.

Similar to the image reading apparatus, the dust/dirt avoidance method and storage medium of the embodiment can also greatly reduce generation of a black streak image caused by dust, dirt, or the like attached to the flow scanning position on the document glass table in flow scanning of reading a document image while moving the document sheet at a predetermined speed.

The present invention is not limited to the above embodiments and various changes and modifications can be made within the spirit and scope of the present invention. Therefore, to apprise the public of the scope of the present invention the following claims are made.

What is claimed is:

1. An image reading apparatus comprising:
   a reading unit configured to read a document image;
   a detection unit configured to detect presence/absence of a foreign matter on an optical path during a document nonreading period of said reading unit;
   a control unit configured to change a reading position or said reading unit so as not to read the foreign matter at least either one of before and after successive reading operation when said reading unit successively reads a plurality of document sheets; and
   a correction unit configured to perform correction processing for an image signal during said successive reading operation based on a detection result of said detection unit.

2. The apparatus according to claim 1, wherein said correction unit achieves correction processing by replacing an image signal corresponding to a pixel address where the foreign matter is detected with a peripheral image signal in accordance with the detection result of said detection unit.

3. The apparatus according to claim 1, wherein said detection unit determines whether an image signal output from said reading unit contains a black signal at not less than a predetermined ratio.

4. The apparatus according to claim 1, further comprising a warning unit configured to issue a waning when the foreign matter cannot be avoided by changing the reading position.

5. The apparatus according to claim 1, wherein, when the foreign matter cannot be avoided by changing the reading position, said control unit inhibits a flow scanning mode in which the document image is wad by said reading unit while a document sheet is conveyed by conveyor means.

6. A computer medium or a computer readable medium storing or comprising a program which causes a computer to execute an image reading method applied to an image reading apparatus having a reading unit which reads a document image, wherein the image reading method comprises
   a detection step of detecting presence/absence of a foreign matter on an optical path during a document nonreading period of the reading unit,
   a control step of changing a reading position of the reading unit so as not to read the foreign matter at least either one of before and after successive reading operation when the reading unit successively reads a plurality of document sheets, and
   a correction step of performing correction processing for an image signal during said successive reading operation based on a detection result of the delection step.

7. The medium according to claim 6, wherein the correction processing is achieved in the correction step by replacing an image signal corresponding to a pixel address where the foreign matter is detected with a peripheral image signal in accordance with the detection result of the detection step.

8. The medium according to claim 6, wherein, whether an image signal output from the reading unit contains a black signal at not less than a predeterm med ratio is determined in the detection step.

9. The medium according to claim 6, further comprising a warning step of issuing a warning when the foreign matter cannot be avoided by change of the reading position which is executed in the control step.

10. The medium according to claim 6, wherein, when the foreign mutter cannot be avoided by changing the reading position, a flow scanning mode in which the document image is read by the reading unit while a document sheet is conveyed by conveyor means is inhibited in the control step.

* * * * *

UNITED STATES PATENT AND TRADEMARK OFFICE
CERTIFICATE OF CORRECTION

PATENT NO. : 7,058,236 B2
APPLICATION NO. : 10/152064
DATED : June 6, 2006
INVENTOR(S) : Kazuhito Ohashi It is certified that error appears in the above-identified patent and that said Letters Patent is hereby corrected as shown below:

Column 8

Line 15, replace "cheeks" with "checks".

Column 11

Line 24, replace "or" with "of".

Line 43, replace "waning" with "warning".

Column 12

Line 4, replace "wad" with "read".

Line 23, replace "delection" with "detection".

Line 32, replace "predeterm med" with "predetermined".

Line 39, replace "mutter" with "matter".

Signed and Sealed this

Fifteenth Day of August, 2006

JON W. DUDAS
*Director of the United States Patent and Trademark Office*